(12) United States Patent
Adami

(10) Patent No.: US 9,802,528 B2
(45) Date of Patent: Oct. 31, 2017

(54) DRIVER ASSIST DEVICE AND INDUSTRIAL TRUCK WITH DRIVER ASSIST DEVICE

(71) Applicant: Linde Material Handling GmbH, Aschaffenburg (DE)

(72) Inventor: Peter Adami, Leidersbach (DE)

(73) Assignee: Linde Material Handling GmbH, Aschaffenburg (DE)

(*) Notice: Subject to any disclaimer, the term of this patent is extended or adjusted under 35 U.S.C. 154(b) by 937 days.

(21) Appl. No.: 13/947,151

(22) Filed: Jul. 22, 2013

(65) Prior Publication Data

US 2014/0158468 A1    Jun. 12, 2014

(30) Foreign Application Priority Data

Jul. 31, 2012   (DE) ......................... 10 2012 106 989

(51) Int. Cl.
| | |
|---|---|
| *B60Q 1/00* | (2006.01) |
| *B60Q 3/00* | (2017.01) |
| *B66F 9/075* | (2006.01) |
| *B66F 17/00* | (2006.01) |
| *B60Q 1/50* | (2006.01) |

(52) U.S. Cl.
CPC .............. *B60Q 1/0035* (2013.01); *B60Q 1/50* (2013.01); *B66F 9/0755* (2013.01); *B66F 17/003* (2013.01); *B60Q 2400/50* (2013.01)

(58) Field of Classification Search
CPC ........ A62C 27/00; B60Q 9/00; B60Q 1/0035; B66F 9/0755; B66F 17/003
USPC ................................................. 362/485, 540
See application file for complete search history.

(56) References Cited

U.S. PATENT DOCUMENTS

| | | | | |
|---|---|---|---|---|
| 4,221,530 A | * | 9/1980 | Williams, IV | B66F 9/07554 180/285 |
| 4,566,032 A | * | 1/1986 | Hirooka | B66F 9/063 180/168 |
| 6,422,728 B1 | * | 7/2002 | Riggin | B60Q 1/16 340/475 |
| 7,561,180 B2 | * | 7/2009 | Koike | B60Q 1/50 340/903 |
| 2002/0190849 A1 | * | 12/2002 | Orzechowski | B66F 9/0755 340/435 |
| 2014/0055252 A1 | * | 2/2014 | Ascencio | B60Q 1/50 340/425.5 |

FOREIGN PATENT DOCUMENTS

| | | |
|---|---|---|
| DE | 102006002960 A1 | 7/2007 |
| DE | 102007063226 A1 | 7/2009 |

* cited by examiner

*Primary Examiner* — Elmito Breval
*Assistant Examiner* — Jessica M Apenteng
(74) *Attorney, Agent, or Firm* — The Webb Law Firm

(57) ABSTRACT

A driver assist device is described for an industrial truck (1) with at least one steered wheel (21) at the rear end of the truck. The driver assist device is located on the industrial truck (1) and projects a lighting effect on the roadway (13). The lighting effect marks a peripheral path (12) of the external periphery (14) of the rear end (15) of the truck on the roadway (13) for a selected steering angle as the industrial truck travels in a curve.

14 Claims, 2 Drawing Sheets

DRIVER ASSIST DEVICE AND INDUSTRIAL TRUCK WITH DRIVER ASSIST DEVICE

CROSS REFERENCE TO RELATED APPLICATION

This application claims priority to German Application DE 10 2012 106 989.1, filed Jul. 31, 2012, herein incorporated by reference in its entirety.

BACKGROUND OF THE INVENTION

Field of the Invention

This invention relates to a driver assist device for an industrial truck and to an industrial truck with a driver assist device. In particular, the invention relates to a driver assist device for an industrial truck having at least one steered wheel at the rear end of the truck, which driver assist device, when located on the industrial truck, projects a lighting effect on the roadway.

Technical Considerations

It is known that a wide range of vehicles, e.g. buses, motor homes and trucks, can be equipped with a camera system to avoid collisions with obstacles in difficult driving situations and in situations where the driver's vision is impeded, and to give the driver an estimation of the path of the vehicle which is difficult or even impossible to obtain by means of mirrors or a direct line of sight. The use of camera systems on industrial trucks, in particular on counterbalance fork-lift trucks, is also known. DE 10 2007 063 226 A1 describes the superimposition of the potential path of the vehicle, as a function of a steering angle, on the display of a camera image to indicate whether, at a selected steering angle, a potential obstacle is located in the path of the vehicle.

One disadvantage of this method is that the display of the camera does not provide a three-dimensional impression but rather only a significantly smaller image of the roadway. This situation requires a high level of attention on the part of the driver to ascertain whether or not there are obstacles in the path of the vehicle.

Industrial trucks that are in the form of counterbalance fork-lift trucks having a lifting mast on the front end are frequently constructed so that the vehicle is driven by means of a forward axle with wheels that are not steered. On the rear of the counterbalance fork-lift truck, there is a counterbalance located with the largest possible lever arm with respect to the lifting mast. Below the counterbalance there are one or two steered wheels. The steered wheels are generally not drive wheels. In an alternative example, in particular for three-wheel fork-lift trucks, the function of steering and optionally propulsion are combined in a single wheel which is located underneath the counterbalance. Industrial trucks which are in the form of warehouse materials handling equipment such as pallet trucks, reach trucks, order pickers, in particular horizontal order pickers or vertical order pickers, swing fork-lift trucks and high-level stackers, are steered by one or more wheels on the rear end of the truck. In all these cases, however, the steered wheels have very large turning angles to achieve the smallest possible turning circle and to make possible a 90° turn even in narrow aisles of warehouse shelves, to enable a load handling device such as a load fork, for example, to be oriented correctly with respect to a shelf space. Steering angles of up to approximately 90° are conventional, corresponding to a position at a right angle to the longitudinal direction of the vehicle. That makes it possible to turn the counterbalance fork-lift truck essentially around the front axle. Both the location of the steered wheels in the rear end and the large turning angle of the wheels means that when the vehicle is traveling at the full steering angle, the rear end of the industrial truck swings out very sharply. This movement can result in damage to adjacent structures, loads or shelves, which can also happen if the driver miscalculates or is unaware of the curve of the path or the path of the periphery of the vehicle and collisions can occur. There are also potential risks to people in the area who are standing behind and to one side in the vicinity of an industrial truck of this type.

DE 10 2006 002 960 A1 describes an industrial truck with an optical warning device in which a lighting effect that points in the direction of travel is projected onto the roadway to warn people in the vicinity of the approach of the industrial truck. One disadvantage of this system is that it does not take into consideration the risks caused by the lateral swinging out of an industrial truck as it travels around a curve.

Therefore, it is an object of the invention to provide a driver assist device as well as an industrial truck, in particular a counterbalance fork-lift truck, with which it is possible to easily and quickly recognize the movement of the industrial truck as it travels on a curved path and thereby to eliminate the disadvantages described above.

SUMMARY OF THE INVENTION

This object is accomplished by a driver assist device for an industrial truck having at least one steered wheel at the rear end of the truck. The driver assist device projects a lighting effect onto the roadway. The lighting effect marks on the roadway the path that will be followed by the outer periphery of the rear end of the vehicle when the industrial truck is traveling around a curve.

When the driver assist device is installed and properly adjusted on an industrial truck, the peripheral path of the vehicle is visibly marked on the roadway by the lighting effect in the form of a line to provide a visual preview of the area over which the outside edge of the rear end of the vehicle will move if it continues to travel at the same steering angle. The peripheral path is thereby the outermost line that is swept by the outside edge of the rear of the vehicle. The peripheral path can be marked while the industrial truck is stopped or while the industrial truck is in motion. It is thereby advantageously possible for a person operating the industrial truck to see (before the vehicle begins to move) whether the rear end of the vehicle, when it swings out at a defined steering angle, would or would not strike an obstacle, because in that case the obstacle would also be illuminated by the lighting effect or it would become apparent that the obstacle is located inside the peripheral path of the vehicle. For a person operating the industrial truck, it therefore becomes possible to more easily estimate the space requirement of the industrial truck as it travels around a curve. Collisions with nearby objects and obstacles, in particular collisions with a shelf, can thus be avoided. People who are in the vicinity can advantageously also be made aware and warned of how wide of an area the vehicle will cover as it continues to travel. This feature further increases safety in cases in which people, in violation of safety requirements, remain in the danger area to the rear and to the side of the industrial truck, in particular with counterbalance fork-lifts but also with other types of warehouse materials handling equipment. The driver assist device of the invention can be in the form of a self-contained, compact unit, which can be installed easily on an industrial truck as part of a retrofitting process. It is thereby conceivable to use, as the peripheral path, peripheral paths that are in any case large enough so that the actual outline of a vehicle lies within the peripheral path even when it swings out as the vehicle travels around a curve.

In one advantageous configuration of the invention, the lighting effect is a continuous or an interrupted line which corresponds to the peripheral path.

Suitable lighting effects include all optical effects that make it apparent that a certain line will be swept by the rear end of the vehicle as the peripheral path.

The peripheral path can be marked in the form of lines or as a broken line by a bundled light source.

In one advantageous embodiment, the lighting effect is produced by a laser.

The object of the invention is also accomplished by an industrial truck with at least one steered wheel at the rear end of the truck and the driver assist device of the type described above in which the lighting effect marks a peripheral path of the outside periphery of the rear end of the vehicle on the roadway as it travels around a curve in relation to a selected steering angle, such as the maximum steering angle of the industrial truck or the instantaneous (current) steering angle of the industrial truck.

An industrial truck which is equipped with the driver assist device of the invention has the advantages discussed above. The peripheral path is preferably indicated on the side of the vehicle toward which the rear end of the vehicle swings out and thus presents the danger of a collision with obstacles, although alternatively the peripheral path can also be indicated on both sides of the vehicle. The person operating the industrial truck can advantageously evaluate whether, when the rear end of vehicle swings out at a determined steering angle, it would or would not strike an obstacle if the obstacle is illuminated by the lighting effects or is located within the peripheral path. People who are in the vicinity will be notified and warned of the pivoting range of the industrial truck by the lighting effects. The solution of the invention is particularly advantageous for all types of industrial trucks which are moved during at least a portion of their operation so that they are steered from the rear in the direction of movement and thus by means of one or more rear wheels. This arrangement results in a particularly wide range of vehicle swing when the vehicle is set to a sharp steering angle. The invention can therefore also be used, for example, on pallet trucks, reach trucks, order pickers (in particular horizontal order pickers or vertical order pickers), swing fork-lift trucks and high-level stackers, which have at least one individual steerable drive wheel, when they are moved forward with a load fork and load rollers. There is also a significant lateral swerving with a steering angle on these types of industrial trucks.

The peripheral path can advantageously be marked beginning from the rear end of the vehicle to approximately the level of the maximum lateral swing with reference to the instantaneous longitudinal axis of the vehicle.

The maximum lateral width by which the vehicle will swing out is thereby displayed and indicated to the driver or operator, as well as what obstacles may be present in this area.

In one advantageous embodiment, the peripheral path for the maximum steering angle of the industrial truck is displayed.

In a simple embodiment, independently of the actual instantaneous steering angle, a fixed peripheral path for the maximum steering angle can be displayed. The maximum steering angle also results in the maximum possible rotational deviation of the outline of the vehicle. Therefore, if there are no obstacles within this peripheral path, the vehicle can be operated at any smaller steering angle.

In one development of the invention, the peripheral path can be indicated for the instantaneous (current) steering angle.

With an automatic adaptation and tracking of the peripheral path as a function of the steering angle, it becomes possible for a driver or an operator to adjust the steering angle when the industrial truck is stopped, for example, before continuing to drive ahead with the industrial truck, until it has been ensured that there will be no collisions with any obstacles. It is thereby conceivable to mark, in addition to the peripheral path for the instantaneous (current) steering angle, the peripheral path for a maximum steering angle.

The driver assist device can be turned on by a steering angle that exceeds a defined minimum angle.

When the driver assist device is turned on and the lighting effect is then projected onto the roadway after the steering angle has exceeded a certain tolerance angle as the minimum angle, no activation by a person is necessary, and the marking on the roadway will always be available whenever it is needed.

The driver assist device can advantageously be turned on by means of a switch.

It is therefore possible to ensure that the driver assist device is not operating continuously in a manner that could be perceived as irritating or unpleasant.

The driver assist device can also be turned on when the vehicle drops below a predetermined speed of travel. Because in general the industrial truck is operated at a large steering angle and at low speeds of travel, the driver assist device can be easily turned on automatically.

The driver assist device can project a lighting effect on the roadway on one side or both sides of the industrial truck.

Normally, it is particularly advantageous to mark the peripheral path on that side of the industrial truck on which the rear end of the vehicle will swing out on account of the steering angle on the next curve. However, both sides of the vehicle can also be marked with the peripheral path, in particular if the peripheral path of the maximum steering angle is marked. The result is a solution that is easier to implement, does not require a measurement of the exact steering angle and for which no more extensive calculations are necessary.

In one advantageous configuration of the invention, the industrial truck has a protective roof over the driver station and the driver assist device has a light source for the lighting effect located in the upper area of the protective roof.

The protective roof over the driver station offers a position in a high location which makes it easier to mark the peripheral path on the roadway.

The industrial truck can have a lifting mast and the driver assist device can be a light source for the lighting effect located in the upper portion of the lifting mast.

Especially on industrial trucks that do not have a tilting lifting mast, a location as described above is advantageous and presents an opportunity for a high placement of the driver assist device. That can be the case, for example, on high lift pallet trucks, reach trucks, order pickers (in particular horizontal order pickers or vertical order pickers), swing fork-lift trucks and high-level stackers.

The industrial truck can have a counterbalance (counterweight) and the driver assist device can be a light source for the lighting effect located in the upper portion of the counterweight.

BRIEF DESCRIPTION OF THE DRAWINGS

Additional advantages and details of the invention are explained in greater detail below with reference to the exemplary embodiment illustrated in the accompanying schematic drawing figures, in which like reference numbers identify like parts throughout.

DESCRIPTION OF THE PREFERRED EMBODIMENTS

Figure 1:
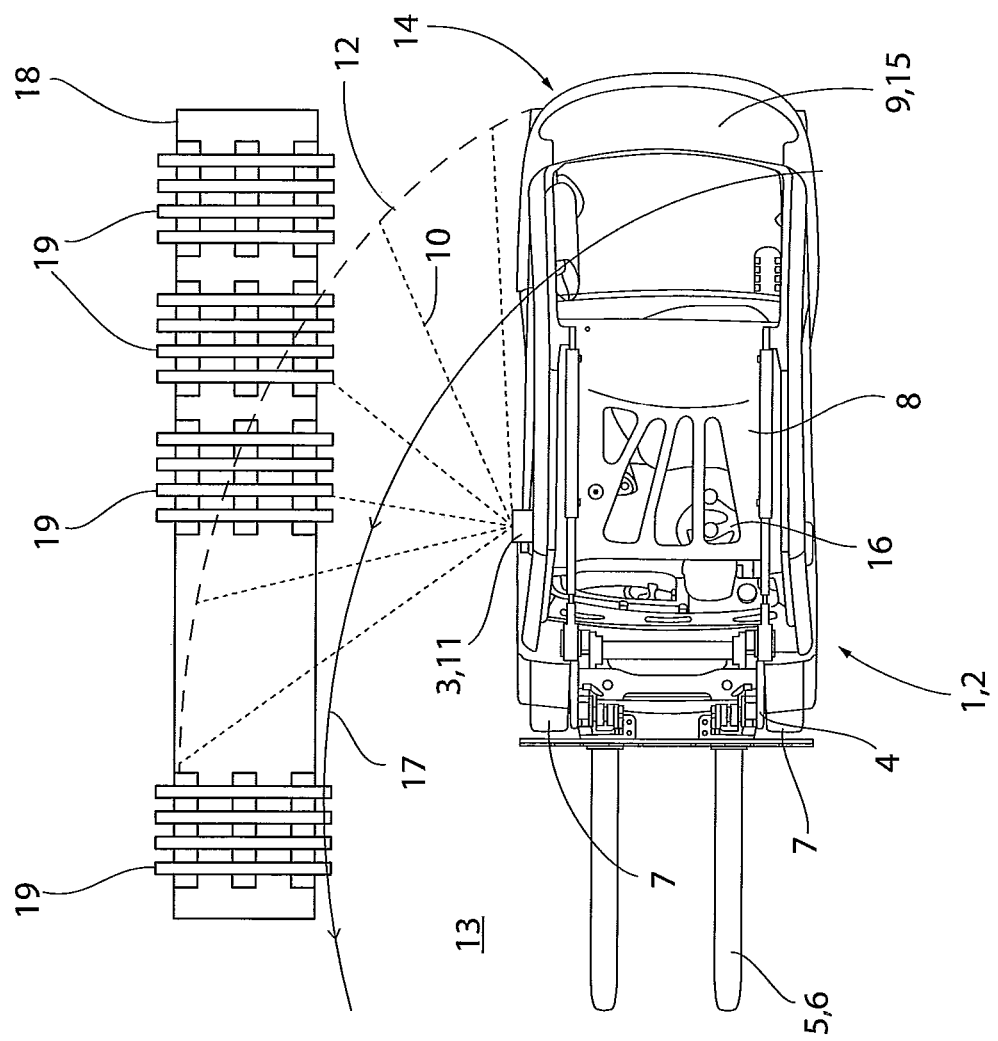
FIG. 1 is a plan view of an industrial truck with a driver assist device of the invention.

FIG. 1 shows a schematic illustration of an industrial truck 1 of the invention, in the form of a counterbalance fork-lift truck 2 with a driver assist 3, shown in a plan view. The counterbalance fork-lift truck 2 has a load handling device 5 in the form of a load fork 6 which is guided on a lifting mast 4. The lifting mast 4 is located above a forward axle with forward wheels 7, by which the counterbalance fork-lift truck 2 is driven. Behind the lifting mast 4 is a protective roof 8 over the driver station and behind the protective roof 8 is a counterbalance 9. Below the counterbalance 9, and not shown in FIG. 1, are steered rear wheels with which the counterbalance fork-lift truck 2 is steered. The driver assist device 3 is located, for example, on the protective roof 8 over the driver station and emits laser light 10 from a laser 11 or bundled light from a light source as a lighting effect, by which a peripheral path 12 is marked on the roadway 13. The peripheral path 12 corresponds to the movement of an external periphery 14 of the rear end 15 of a counterbalance fork-lift truck 2 when the truck begins to move out of the illustrated position at the selected steering angle defined by the rear wheels, corresponding to a steering angle of a steering wheel 16. When the counterbalance fork-lift truck 2 begins to move from the illustrated position, the center of the counterbalance 9 moves along the line 17 and the outside periphery 14 of the rear end 15 of the vehicle formed by the counterbalance 9 sweeps the peripheral path 12 marked by the laser 11.

In the illustrated position of the counterbalance fork-lift truck 2, a shelf 18 on which pallets 19 have been set down is located next to the counterbalance fork-lift truck 2. The peripheral path 12 shown at the current steering angle of the steering wheel 16 falls on the shelf 18 and is easily visible to the driver of the counterbalance fork-lift truck 2 as a lighting effect. The driver is thus warned to reduce the steering angle of the steering wheel 16 or to pay particular attention to the approach to the shelf 18 and to stop the counterbalance fork-lift truck 2. Any person who was between the counterbalance fork-lift truck 2 and the shelf 18 would also be warned by the light of the peripheral path 12 that he or she is in a hazardous area.

Figure 2:
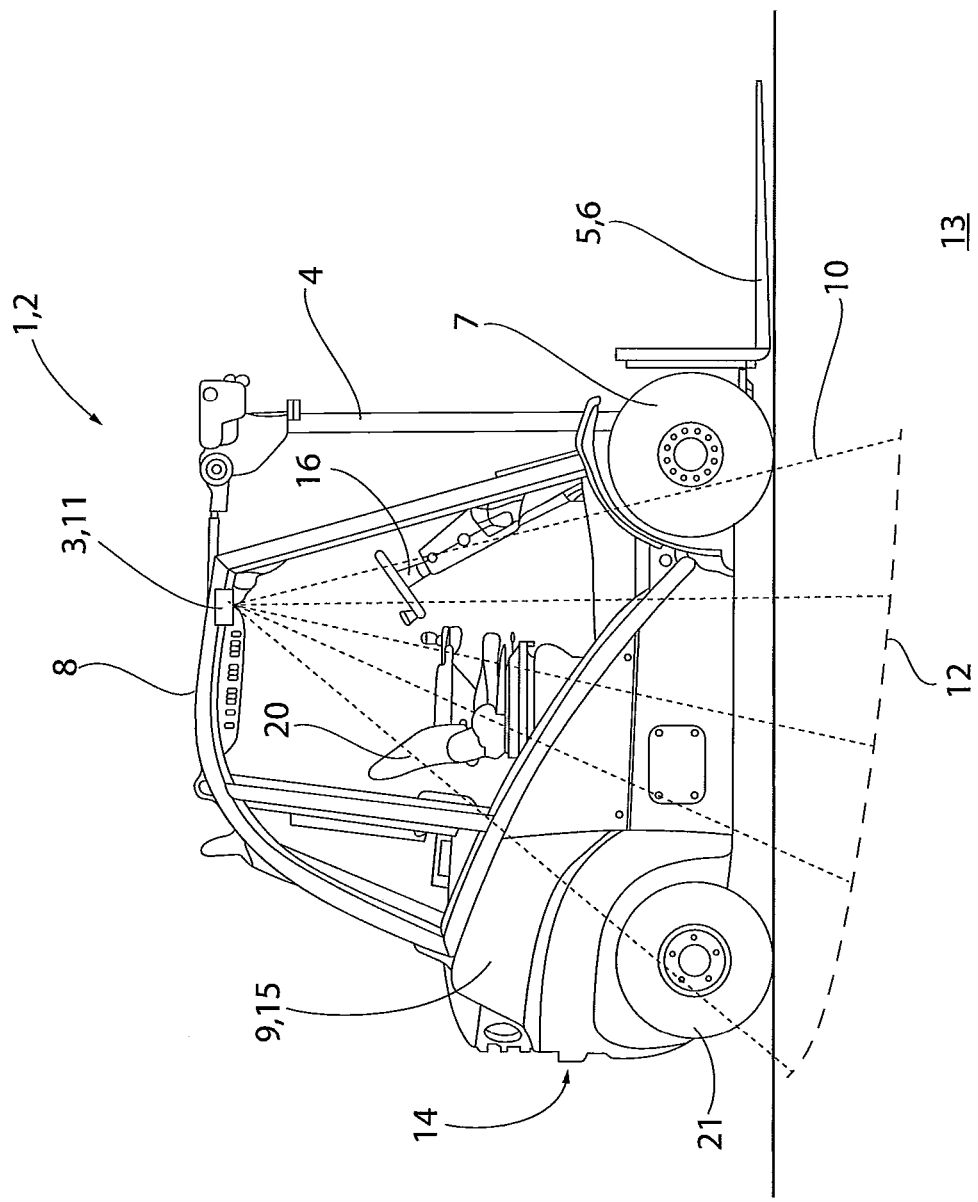
FIG. 2 is a side view of the industrial truck of the invention illustrated in FIG. 1.

FIG. 2 is a side view of the counterbalance fork-lift truck 2 illustrated in FIG. 1. The driver assist device 3 is fastened to the side of the protective roof 8 above the driver station. The load handing device 5, in the form of the load fork 6, is guided on the lift mast 4, which is above the driven front wheels 7. A driver's seat 20 with the steering wheel 16 is located below the protective roof 8. The counterbalance 9 with the steered rear wheels 21 located underneath is located at the rear end of the vehicle 15. The light source of the driver assist device 3, which can be in the form of a laser, for example, emits laser light 10, by which the peripheral path 12 is marked on the roadway 13, in this example as a broken line. Alternatively, the peripheral path 12 can also be marked by a solid or continuous line.

If the steering wheel 16 is turned by a defined minimum angle out of the straight-ahead position, the laser 11 or alternatively another light source will automatically turn on the driver assist device 3 for the duration of the turn and display the peripheral path 12 corresponding to the instantaneous steering angle. It is therefore quickly and intuitively apparent to the driver where the rear end 15 of the vehicle 2 will move as it continues to travel and where a collision with the outside periphery 14 could occur. The steering angle of the steered rear wheels 21 or of the steering wheel 16 can be determined by any conventional methods and devices known in the art, such as by sensors, and fed to the driver assist device 3. The elevated position of the driver assist device 3 on the protective roof 8 above the driver makes possible an accurate and clear image of the peripheral path 12.

The invention is not limited to the example described here of a counterbalance fork-lift truck 2 as the industrial truck 1, and can be applied to all types of industrial trucks on which one or more steered rear wheels cause a significant swinging out of the rear of the vehicle during travel on a curve.

It will be readily appreciated by those skilled in the art that modifications may be made to the invention without departing from the concepts disclosed in the foregoing description. Accordingly, particular embodiments described in detail herein are illustrative only and are not limiting to the scope of the invention, which is to be given the full breadth of the appended claims and any and all equivalents thereof.

The invention claimed is:

1. A driver assist device for an industrial truck having at least one steered wheel at a rear end of the truck, which driver assist device comprises:
    a light source configured to be mounted on an industrial truck and to project a lighting effect on a roadway, wherein the lighting effect marks a peripheral path of an external peripheral surface of a rear end of the industrial truck as the industrial truck travels on a curve,
    wherein the peripheral path is marked beginning from a rear end of the truck to a maximum lateral deviation with reference to a longitudinal axis of the truck.

2. The driver assist device as recited in claim 1, wherein the lighting effect comprises a solid or broken line which corresponds to the peripheral path.

3. The driver assist device as recited in claim 1, wherein the lighting effect is produced by a laser.

4. An industrial truck comprising:
    at least one steered wheel at the rear end of the truck; and
    a driver assist device comprising at least one light source mounted on the industrial truck,
    wherein the driver assist device projects a lighting effect on a roadway, and wherein the lighting effect marks a peripheral path of an outside peripheral surface of the rear end of the industrial truck on the roadway for a selected steering angle as the industrial truck travels on a curve, and
    wherein the peripheral path is marked beginning from the rear end of the truck to a maximum lateral deviation with reference to a longitudinal axis of the truck.

5. The industrial truck as recited in claim 4, wherein the peripheral path is for a maximum steering angle of the industrial truck.

6. The industrial truck as recited in claim 4, wherein the peripheral path is for an instantaneous steering angle of the industrial truck.

7. The industrial truck as recited in claim 4, wherein the driver assist device is turned on by a steering angle that exceeds a predetermined minimum steering angle.

8. The industrial truck as recited in claim 4, wherein the driver assist device is turned on by a switch.

9. The industrial truck as recited in claim 4, wherein the driver assist device is turned on when a speed of the truck drops below a predetermined speed limit.

10. The industrial truck as recited in claim 4, wherein the driver assist device projects a lighting effect on the roadway on one side or both sides of the industrial truck.

11. The industrial truck as recited in claim 4, wherein the industrial truck has a protective roof over a driver station and the light source for the lighting effect is located in an upper area of the protective roof.

12. The industrial truck as recited in claim 4, wherein the industrial truck has a lifting mast and the light source for the lighting effect is located on an upper area of the lifting mast.

13. The industrial truck as recited in claim 4, wherein the industrial truck has a counterbalance and the light source for the lighting effect is located on an upper area of the counterbalance.

14. The industrial truck as recited in claim 4, wherein the steering angle is selected from the group consisting of a maximum steering angle of the industrial truck and an instantaneous steering angle of the industrial truck.

* * * * *